US011942300B1

(12) United States Patent
Bayer et al.

(10) Patent No.: US 11,942,300 B1
(45) Date of Patent: Mar. 26, 2024

(54) SMD FUSE WITH PRE-MOLDED SHIELD

(71) Applicant: Littelfuse, Inc., Chicago, IL (US)

(72) Inventors: Sheila Marie Vinas Bayer, Batangas (PH); Randy Capablanca Servancia, Batangas (PH); Fernando Isip Arce, Jr., Batangas (PH); Edwin Canido Aberin, Batangas (PH); Roel Santos Retardo, Batangas (PH); Francisco Rivera De Guia, Jr., Batangas (PH)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 18/099,012

(22) Filed: Jan. 19, 2023

(51) Int. Cl.
*H01H 85/175* (2006.01)
*H01H 85/143* (2006.01)

(52) U.S. Cl.
CPC ....... *H01H 85/1755* (2013.01); *H01H 85/143* (2013.01)

(58) Field of Classification Search
CPC ............. H01H 85/143; H01H 85/1755; H01H 85/2045; H01H 2085/2085; H01H 85/22
See application file for complete search history.

(56) References Cited

U.S. PATENT DOCUMENTS 3,813,626 A * 5/1974 Cetola .................. H01H 85/547 337/213
4,094,212 A * 6/1978 Hyams ................. H01H 85/547 294/131
4,473,268 A * 9/1984 Watanabe .............. H01H 85/34 439/483
4,755,785 A * 7/1988 Bernstein ........... H01H 85/2045 361/767
4,841,413 A * 6/1989 Mizerak ................. H01H 85/25 337/186
4,926,290 A * 5/1990 Mizerak ................. H01H 85/25 361/837
4,962,363 A * 10/1990 Sexton, Jr. ........... H05K 3/3442 337/213
5,150,094 A * 9/1992 Babini ............... H01H 85/2045 337/186
5,925,280 A * 7/1999 Lee .................... H01H 85/2045 337/205
5,982,266 A * 11/1999 Sanford .................... B25B 9/02 81/487
2007/0093089 A1* 4/2007 Ford ........................ H01H 9/10 439/76.2
2008/0184560 A1* 8/2008 Pizzi ...................... H01H 85/56 29/874
2019/0318894 A1* 10/2019 Chiu .................. H01H 85/2045

* cited by examiner

*Primary Examiner* — Jacob R Crum
(74) *Attorney, Agent, or Firm* — KDW Firm PLLC

(57) ABSTRACT

A fuse shield features a cylindrical body, a first cap cover, a second cap cover, and a stop region. The cylindrical body is adapted to be placed over and partially surround a cylindrical fuse. The cylindrical body is sandwiched between the first and second cap covers. The stop region is located on an edge of the first cap cover to limit rotation of the cylindrical fuse to a first degree in one direction on a flat surface.

6 Claims, 10 Drawing Sheets

600

| 242.050UR WITH SHIELD | | |
|---|---|---|
| | RESISTANCE 9.8?-12.7? NOM.11.34? | BLOW TIME 10SECS MAX @ 300% OL TEST |
| MIN | 10.415 | 0.008 |
| MAX | 11.415 | 0.012 |
| AVE | 10.9763 | 0.0099 |
| 1 | 10.644 | 0.011 |
| 2 | 10.522 | 0.008 |
| 3 | 11.291 | 0.010 |
| 4 | 11.415 | 0.010 |
| 5 | 11.408 | 0.011 |
| 6 | 10.415 | 0.010 |
| 7 | 10.944 | 0.008 |
| 8 | 11.330 | 0.010 |
| 9 | 10.763 | 0.009 |
| 10 | 11.031 | 0.012 |

FIG. 6

700

| 242.050UR WITH SHIELD | | | | |
|---|---|---|---|---|
| | PRE-TEST RN 9.8?-12.7? NOM.11.34? | POST TEST RN 9.8?-12.7? NOM.11.34? | RESISTANCE SHIFT % | OPENING TIME 4HRS. MIN @ 110% LIFE TEST |
| MIN | 10.301 | 10.356 | -0.06% | |
| MAX | 12.091 | 12.115 | 2.96% | |
| AVE | 11.0302 | 11.0917 | 0.54% | |
| 1 | 11.711 | 12.058 | 2.96% | PASS BANK 5 |
| 2 | 10.918 | 10.924 | 0.05% | |
| 3 | 10.892 | 10.931 | 0.36% | |
| 4 | 11.025 | 11.040 | 0.14% | |
| 5 | 10.743 | 10.782 | 0.36% | |
| 6 | 10.301 | 10.356 | 0.53% | |
| 7 | 11.064 | 11.057 | -0.06% | |
| 8 | 10.668 | 10.718 | 0.47% | |
| 9 | 10.889 | 10.936 | 0.43% | |
| 10 | 12.091 | 12.115 | 0.20% | |

FIG. 7

SMD FUSE WITH PRE-MOLDED SHIELD

FIELD OF THE DISCLOSURE

Embodiments of the present disclosure relate to surface mount fuses and, more particularly, to surface mount fuses that are suitable for pick-and-place automation assembly.

BACKGROUND

Fuses are current-sensitive devices that are designed as the intentional weak link in an electric circuit. Typically, fuses consist of a fusible element (the intentional weak link) disposed between two terminals, where the fusible element is contained in a housing. The function of the fuse is to provide discrete component or complete circuit protection by reliably melting under overcurrent conditions and thus safely interrupting the flow of current.

In addition to selecting a fuse based on its intrinsic characteristics, such as voltage and current rating, a fuse may be selected based on its shape. Fuses may have axial leads for through-hole attachment to a printed circuit board (PCB) or may be leadless for surface mount attachment. Even within these two categories, a vast array of fuse shapes and sizes exist for different applications. One type of surface mount fuse cylindrical features a cylindrical housing disposed between a pair of cylindrical cap terminals.

One automation technique used in populating PCBs is known as pick-and-place. Components, such as resistors, capacitors, integrated circuits, and fuses are placed on a tape-and-reel spool. The pick-and-place machine retrieves the components, one by one, from the spool, and places them on the PCB in the intended location. In other operations, the components are located, not on a spool, but on a surface for retrieval by the pick-and-placed machine. Because cylindrical fuses tend to roll when placed on a flat surface, they are not suitable for pick-and-place assembly operations. Further, industry tends to shrink the PCB board design to achieve space savings. The ability to orient other devices on the PCB with respect to the fuse is challenged when the fuse rolls freely, and may result in possible shorting during assembly It is with respect to these and other considerations that the present improvements are useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a fuse shield in accordance with the present disclosure may include a shield adapted to partially surround a cylindrical fuse. The fuse shield includes a cylindrical body, a first cap cover, a second cap cover, and a stop region. The cylindrical cover is adapted to be placed over and partially surround a cylindrical fuse. The first cap cover is located on one side of the cylindrical body and the second cap cover is located on the other, opposite side of the cylindrical body. The stop region is located on an edge of the first cap cover to limit rotation of the cylindrical fuse to a first degree in one direction on a flat surface.

An exemplary embodiment of shield for use with a round body fuse in accordance with the present disclosure may include a cylindrical body, a first cap, and a second cap. The cylindrical body partially surrounds a housing of the round body fuse. The first cap is adapted to partially surrounds a first terminal of the round body fuse and is adjacent the cylindrical body at a first end. The second cap is adapted to partially surrounds a second terminal of the round body fuse and is adjacent the cylindrical body at a second, opposite end.

An exemplary embodiment of a method to attach a pre-molded shield to a cylindrical fuse in accordance with the present disclosure may include positioning and pushing operations. The pre-molded shield is pushed over the cylindrical fuse, where the pre-molded shield includes two cap covers located between a body, the first cap cover being adjacent one end cap of the cylindrical fuse and the other cap cover being adjacent the other end cap. The pre-molded shield is then pushed over the cylindrical fuse, with stop regions of the pre-molded shield being on either side and a first distance apart. The stop regions separate to being a second distance apart during the pushing operation.

BRIEF DESCRIPTION OF THE DRAWINGS

FIG. 6 is a table of characteristics of the shielded cylindrical fuse of FIGS. 2A-2B, in accordance with exemplary embodiments;

FIG. 7 is a table of characteristics of the shielded cylindrical fuse of FIGS. 2A-2B, in accordance with exemplary embodiments;

DETAILED DESCRIPTION

A surface mount device cylindrical fuse is disclosed with a pre-molded shield. The pre-molded shield covers a portion of the cylindrical housing of the cylindrical fuse as well as some of its end caps (terminals). Flexible enough to snap over the cylindrical fuse, the pre-molded shield has a top flat surface to facilitate retrieval of the shielded cylindrical fuse during pick-and-place automation operations. The bottom portion of the pre-molded shield is also planar and limits rotation of the cylindrical fuse on a flat surface, which also facilitates pick-and-place automation.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1:
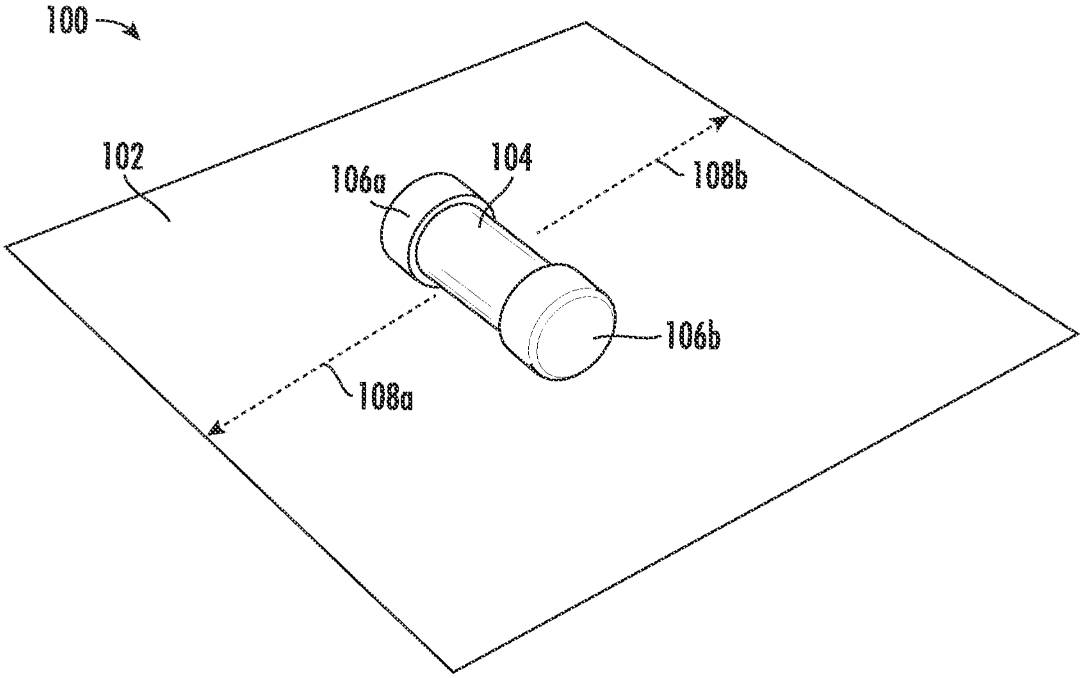
FIG. 1 PRIOR ART
FIG. 1 is a diagram illustrating a cylindrical fuse, in accordance with the prior art.

FIG. 1 is a representative drawing of a cylindrical fuse 100, according to the prior art. The cylindrical fuse 100 is disposed on a flat surface 102, such as a printed circuit board (PCB). The cylindrical fuse 100 includes a body 104 inside which a fusible element is disposed (not shown), and two end caps (terminals) 106*a*-106*b* (collectively, "end caps 106"). The body 104 is cylindrical, and thus can roll on the flat or even on a nearly flat surface 102. Like the body 104, the end caps 106 are cylindrical where they join the body, resulting in a longer cylindrical shape for the cylindrical fuse 100. Also known as a round body fuse, the cylindrical fuse 100 is a type of surface mount device (SMD) in which the end caps 106, as the terminals of the fuse, are soldered onto pads of a PCB.

Because of the cylindrical shape, the cylindrical fuse 100 is capable of and likely to roll on an axis orthogonal to the body 104. The cylindrical fuse 100 may rotate in a first direction 108*a* or a second direction 108*b*, as the two directions constitute an axis orthogonal to the body 104 of the cylindrical fuse. Put another way, the first direction 108*a* is 180° from the second direction 108*b*. The cylindrical fuse 100 may rotate more than 360°, that is, in at least a complete rotation around the body 104 in either direction 108*a* or 108*b*. Depending on the size of the flat surface 102, the cylindrical fuse 100 may rotate multiple times. Left unattended, the cylindrical fuse 100 may rotate, in either direction 108*a* or 108*b*, eventually falling off the flat surface 102.

Automation is ubiquitous in PCB assembly, and fuses are no exception. One pick-and-place automation technique involves picking up and moving a component to a desired location on the PCB. Because cylindrical fuses tend to roll when placed on a flat surface, they are not suitable for these pick-and-place assembly operations because the machine expects the cylindrical fuses to remain in one location (not move) during retrieval.

Figure 2A:
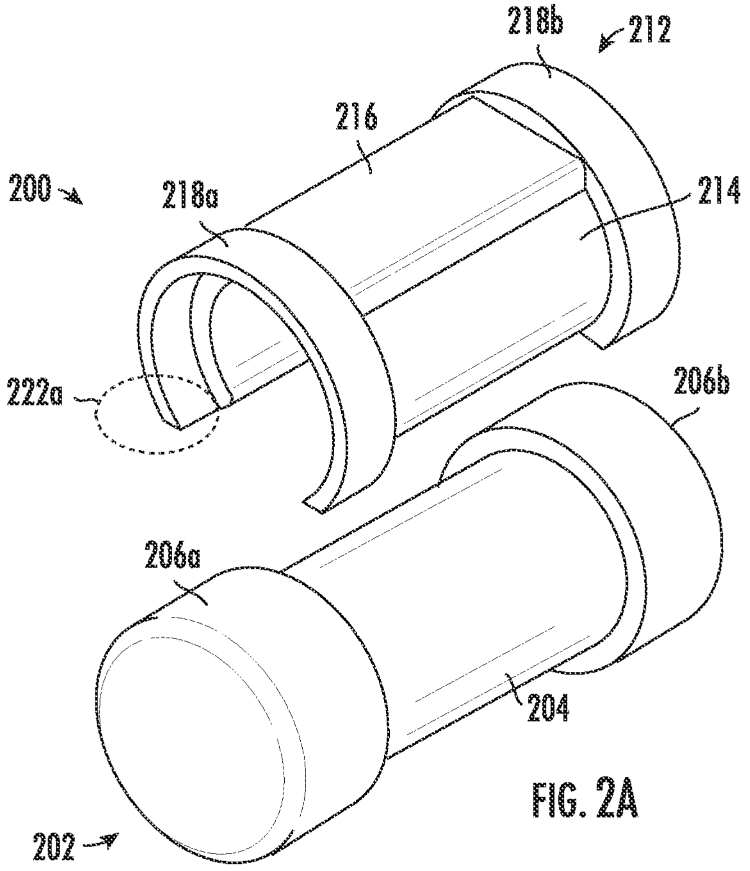
FIGS. 2A-2B are diagrams illustrating a shielded cylindrical fuse, in accordance with exemplary embodiments.
Figure 2B:
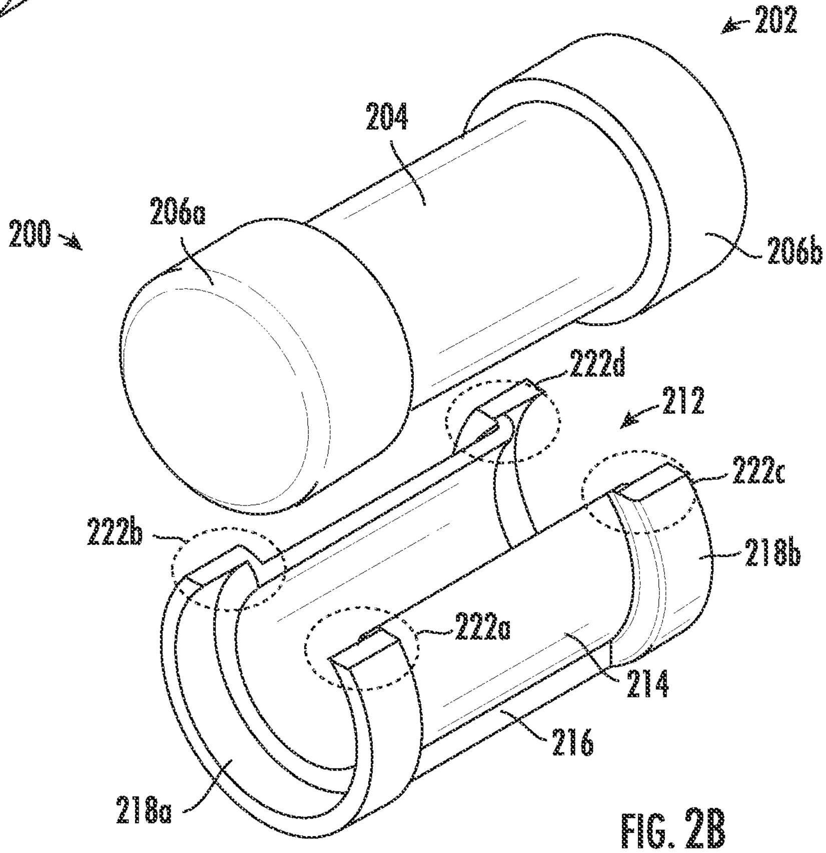

FIGS. 2A-2B are representative drawings of a fuse assembly consisting of a cylindrical fuse with a pre-molded shield 200 (hereinafter, "shielded cylindrical fuse 200"), according to exemplary embodiments. FIG. 2A is an exploded perspective top view and FIG. 2B is an exploded perspective bottom view of the shielded cylindrical fuse 200. The shielded cylindrical fuse 200 is made up of a cylindrical fuse 202 and a pre-molded shield 212 suitable for attaching to and substantially surrounding the cylindrical fuse. As before, the cylindrical fuse 202 includes a body 204 which is cylindrical and two end caps (terminals) 206*a-b* (collectively, "end caps 206"), with one end cap 206*a* being disposed at one end of the body 204 and the other end cap 206 being disposed at a second, opposite end of the body. The body 204 constitutes a housing of the fusible element (not shown) of the cylindrical fuse 202. Like the cylindrical fuse 100, the cylindrical fuse 202 is a SMD round body fuse in which the end caps 206, as the terminals of the fuse, are soldered onto pads of a PCB.

In exemplary embodiments, the pre-molded shield 212 consists of a body 214, a flat portion 216, and two cap covers 218*a* and 218*b* (collectively, "cap covers 218"). The cap covers 218 are disposed on either end of the body 214, with cap cover 218*a* being at a first end of the pre-molded shield 212 and also adjacent a first side of the body 214, and the cap cover 218*b* being adjacent a second, opposite side of the body 214.

In exemplary embodiments, the flat portion 216 is a portion of the pre-molded shield 212 that is planar. In exemplary embodiments, the flat portion 216 is equidistant a first edge and a second edge of the cylindrical body 214. In some embodiments, the flat portion 216 does not occupy either of the cap covers 218 but is instead sandwiched between cap cover 218*a* and 218*b*.

In exemplary embodiments, the cap covers 218 and the body 214 of the pre-molded shield 212 are all cylindrical in shape. In exemplary embodiments, the pre-molded shield 212 substantially surrounds and covers the cylindrical fuse 202 but does not completely surround and cover the cylindrical fuse. In exemplary embodiments, the pre-molded shield 212 surrounds and circumferentially covers more than half the cylindrical fuse 202. In some embodiments, the pre-molded shield 212 circumferentially covers between 65% (234°) and 85% (306°) of the cylindrical fuse 202. In a preferred embodiment, the pre-molded shield 212 circumferentially covers approximately 75% (270°) of the cylindrical fuse 202.

In addition to substantially covering the body 204 of the cylindrical fuse 202, in exemplary embodiments, the pre-molded shield 212 also partially covers the end caps 206 of the cylindrical fuse. In exemplary embodiments, the cap covers 218 of the pre-molded shield 212 are sized to fit over the end cap portions 208. In exemplary embodiments, the cap covers 218 of the pre-molded shield 212 have a slightly larger diameter than that of the body 214.

In exemplary embodiments, the pre-molded shield 212 further includes stop regions 222*a-d* (collectively, "stop regions 222"). The stop regions 222 are the portion of the pre-molded shield 212 that limit the rotational movement of the cylindrical fuse 202 on a flat surface once the pre-molded shield is placed over the cylindrical fuse. In exemplary embodiments, the flat portion 216 is located opposite the stop regions 222 and is equidistant therebetween.

As used herein, the phrase, "limit rotation" is defined herein to mean that the cylindrical fuse 202 is prevented from rotating as it would be able to without the pre-molded shield 212. In some embodiments, to limit rotation of the cylindrical fuse 202 means the cylindrical fuse cannot rotate more than 126° around its circumference, due to having a pre-molded shield 212 that surrounds 65% of the cylindrical fuse, which is equivalent to limiting its movement to no more than 63° in one direction. In some embodiments, to limit rotation of the cylindrical fuse 202 means the cylindrical fuse cannot rotate more than 90° around its circumference, due to having a pre-molded shield 212 that surrounds 75% of the cylindrical fuse, which is equivalent to limiting its movement to no more than 45° in one direction. In exemplary embodiments, to limit rotation of the cylindrical fuse 202 means the cylindrical fuse cannot rotate more than 54° around its circumference, due to having a pre-molded shield 212 that surrounds 85% of the cylindrical fuse, which is equivalent to limiting its movement to no more than 27° in one direction.

In exemplary embodiments, the stop regions 222 are disposed on the two edges of each cap cover 218. Since the pre-molded shield 212 does not fully surround the cylindrical fuse 202, the body 214 and cap cover 218 each have two edges at opposite ends of the open cylindrical structure of the pre-molded shield.

Thus, as illustrated in FIG. 2B, stop region 222*a* is disposed at first edge of cap cover 218*a* while stop region 222*b* is disposed at a second edge of cap cover 218*a*. Thus, stop region 222*a* is on one side of the open cylindrical structure whereas stop region 222*b* is at the second, opposite side of the open cylindrical structure, and both stop region 222*a* and 222*b* are part of the same cap cover 218*a*. Stop region 222c is disposed at a first edge of cap cover 218b while stop region 222d is disposed at a second edge of cap cover 218b. Thus, stop region 222c is on one side of the open cylindrical structure whereas stop region 222d is at the second, opposite side of the open cylindrical structure, and both stop region 222c and 222d are part of the same cap cover 218b.

In exemplary embodiments, assembly of the cylindrical fuse 202 is completed before the pre-molded shield 212 is added thereon. Thus, the two end caps 206 are added to either side of the body 204, which houses the fusible element. After the two end caps 206 are assembled, the pre-molded shield 212 is affixed to the cylindrical fuse 202. In exemplary embodiments, the pre-molded shield 212 is somewhat flexible, and expands slightly at the open end (including the stop regions 222) to enable the pre-molded shield to be pushed onto the cylindrical fuse 202. Once the stop regions 222 are disposed more than halfway over the body 204 of the cylindrical fuse 202, with the halfway point having the highest diameter, the pre-molded shield 212 conforms back to its original shape, thus forming a tight coupling to the cylindrical fuse, without need of adhesive. In exemplary embodiments, the pre-molded shield 212 is not thereafter removed from the cylindrical fuse 202, as the shielded cylindrical fuse 200 functions as intended with the pre-molded shield thereon.

Figure 3:
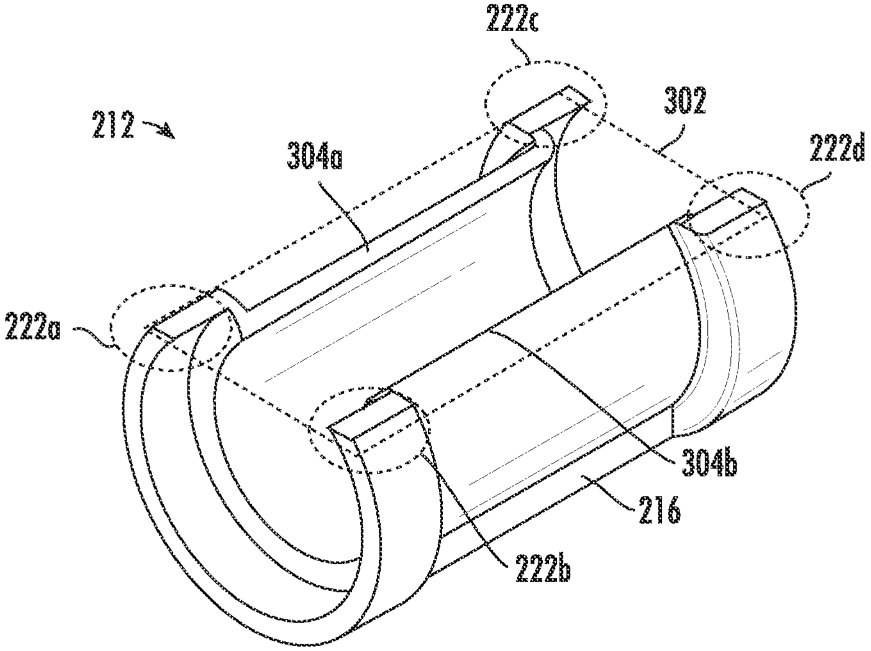
FIG. 3 is a diagram illustrating the pre-molded shield used in the shielded cylindrical fuse of FIGS. 2A-2B, in accordance with exemplary embodiments.
Figure 5A:
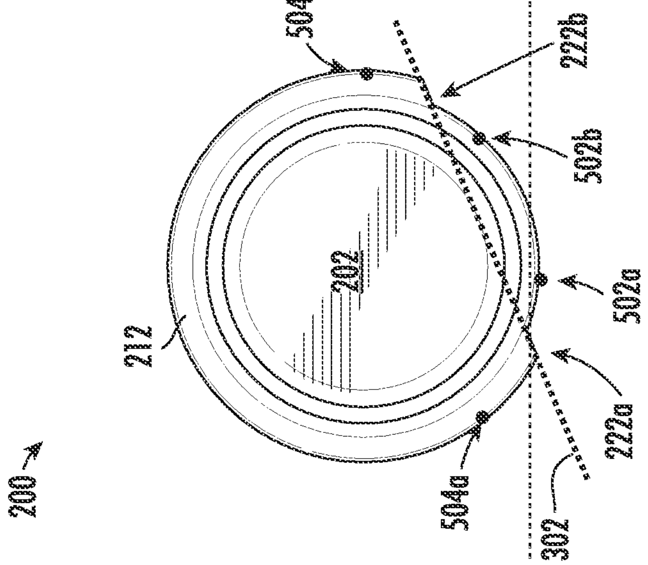
FIGS. 5A-5C are diagrams illustrating the shielded cylindrical fuse of FIGS. 2A-2B, in accordance with exemplary embodiments.
Figure 5B:
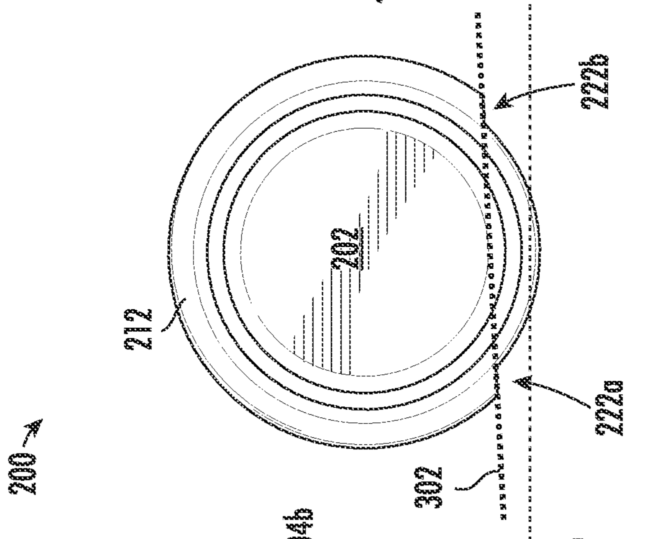
Figure 5C:
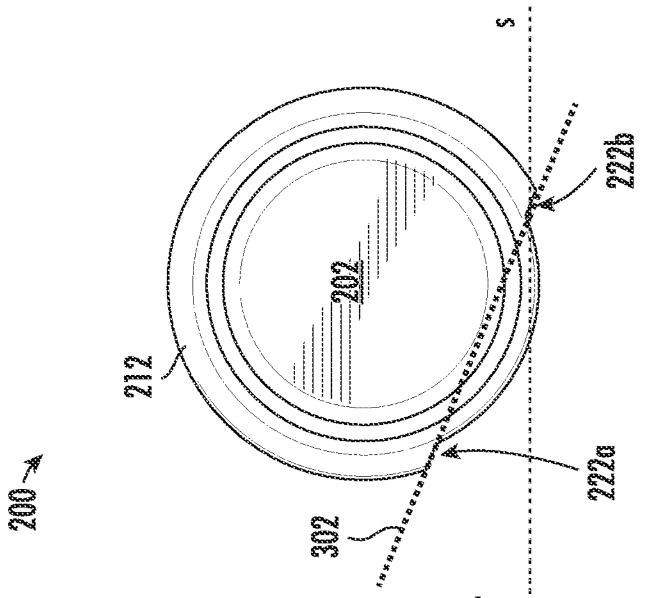

FIG. 3 is a representative drawing of the pre-molded shield 212 to be attached to the cylindrical fuse 202 and forming the shielded cylindrical fuse 200 of FIGS. 2A-2B, according to exemplary embodiments. In the bottom perspective view, the stop regions 222 are clearly shown. The bottom of the pre-molded shield 212 form a second flat surface (besides the flat portion 216), as indicated by a plane 302 (dashed lines). Body ends 304a and 304b (collectively, “body ends 304”) are also in the plane 302 and are thus planar to the stop regions 222. The body ends 304 may thus also be thought of as “stop regions”. As shown in FIGS. 5A-5C, below, the stop regions 222 and body ends 304 in the plane 302 control the rotation of the shielded cylindrical fuse 200 on a flat surface.

Figure 4A:
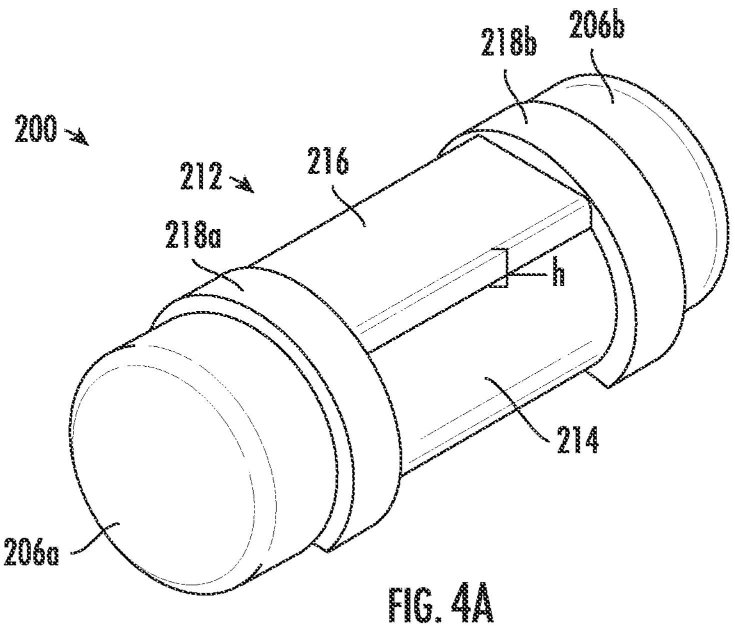
FIGS. 4A-4C are diagrams illustrating the shielded cylindrical fuse of FIGS. 2A-2B, in accordance with exemplary embodiments.
Figure 4B:
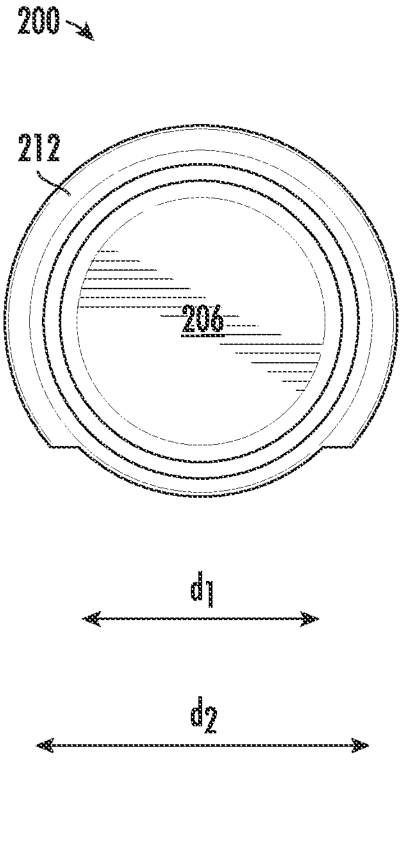
Figure 4C:
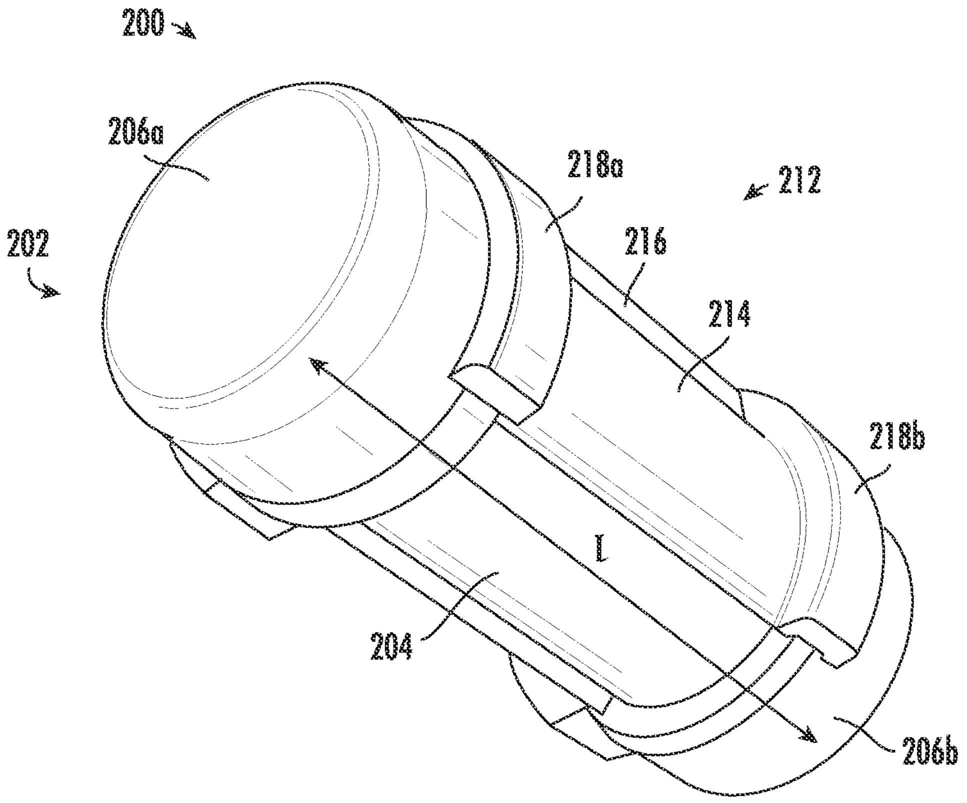

FIGS. 4A-4C are representative drawings of the shielded cylindrical fuse 200 of FIGS. 2A-2B, according to exemplary embodiments. FIG. 4A is a top perspective view, FIG. 4B is a side view, and FIG. 4C is a bottom perspective view of the shielded cylindrical fuse 200. In FIG. 4A, the flat portion 216 of the pre-molded shield 212 has a height, h. The flat portion 216 simplifies the labeling of the shielded cylindrical fuse 200, as labels print more easily on flat surfaces (as compared to cylindrical surfaces). The cylindrical shape of the cylindrical fuse 100 poses handling difficulties such as rolling and potential displacement during board mounting.

In exemplary embodiments, in addition to providing a surface for marking, the flat portion 216 enables the pick-and-place device to grip the shielded cylindrical fuse 200. In exemplary embodiments, the height, h, is selected to accommodate the characteristics of the pick-and-place machinery, where the height, h, is sufficient for the pick-and-place machinery to grab, grip, clasp, or otherwise retrieve the shielded cylindrical fuse 200 from a surface. The pre-molded shield 212 can also facilitate the marking of the cylindrical fuse 202 to facilitate pick-and-place applications. The pre-molded shield 212 thus enables the shielded cylindrical fuse 200 to be used in high-speed pick-and-place applications.

As the name suggests, the pre-molded shield 212 is made as a unitary structure using a mold, including but not limited to injection molded plastic, thermoform, and so on. The cap covers 218 of the pre-molded shield 212 have a circumference that is slightly larger than that of the body 214. In some embodiments, the body 214 of the pre-molded shield 212 has a diameter, $d_1$, and the cap covers 218 have a diameter, $d_2$, where $d_1 < d_2$. Also, in exemplary embodiments, the diameter, $d_2$, of the cap covers 218 is interference fit to the diameter, $d_1$, of the body plus the height, h, of the flat portion 216, as shown in FIG. 4A, such that the flat portion 216 is disposed within the circumference of the cap covers 218. Further, the body 204 of the cylindrical fuse 202 has a diameter that is interference fit to the diameter, $d_1$ and the end caps 206 have a diameter that is interference fit to the diameter, $d_2$.

As shown particularly in FIG. 4C, the cap covers 218 of the pre-molded shield 212 cover a portion of the end caps 206, in some embodiments. The size of the cap covers 218 may vary, depending on how much of the end caps 206 are to be covered.

FIGS. 5A-5C are representative drawings of the shielded cylindrical fuse 200, according to exemplary embodiments. The side views of the cylindrical fuse 200 are shown in a first position (FIG. 5A), a second position (FIG. 5B), and a third position (FIG. 5C). The plane 302 (thick dashed lines) from FIG. 3 as well as a flat surface, s (thin dashed lines) are shown. The pre-molded shield 212 of the shielded cylindrical fuse 200 controls the amount of rotation on the flat surface, s, that will occur. In exemplary embodiments, with the pre-molded shield 212, the cylindrical fuse 202 will not rotate 360°, as does the prior art cylindrical fuse 100 (FIG. 1).

In exemplary embodiments, the circumferential coverage of the pre-molded shield 212 on the cylindrical fuse 202 is adjustable, based on how much control over movement of the shielded cylindrical fuse 200 is desired. For example, assume that the shielded cylindrical fuse 200 in FIGS. 5A-5C rolls x inches on the flat surface, s, and the pre-molded shield 212 covers 75% (270°) of the cylindrical fuse 202. If the environment calls for the shielded cylindrical fuse 200 to roll y inches, where $y < x$, then the pre-molded shield 212 may be designed to cover 85% (306°) of the cylindrical fuse 202. By having the stop regions 222 lower on the cylindrical fuse 102, such as at locations 502a and 502b in FIG. 5A, the shielded cylindrical fuse 200 will rotate less, thus moving y inches. Or if the environment enables the shielded cylindrical fuse 200 to roll z inches, where $z > x$, then the pre-molded shield 212 may be designed to cover 65% (234°) of the cylindrical fuse 202. By having the stop regions 222 higher on the cylindrical fuse 102, such as at locations 504a and 504b in FIG. 5A, the shielded cylindrical fuse 200 will rotate more, thus moving z inches.

FIGS. 6 and 7 are representative tables 600 and 700 showing results of empirical tests performed on the shielded cylindrical fuse 200, according to exemplary embodiments. Since the pre-molded shield 212 is designed to be permanently coupled with the cylindrical fuse 202, the tests were run to ensure that the cylindrical fuse 202 operates as designed. In Table 600, the resistance and blow time were measured for ten fuses experiencing a 300% current overload, which is enough to cause the fuses to break. A maximum resistance of 11.415 ohms and a maximum blow time of 0.012 seconds were noted, which is well within the specification for the cylindrical fuse.

In Table 700, pre- and post-run resistances were measured so that a resistance shift could be measured. A maximum resistance shift of 2.96% was recorded, which is also within specification for the cylindrical fuse. The right side of Table 700 shows that the ten fuses were subjected to a life test in which 110% current was issued for four hours, where 110% is not enough to break the fuse. All fuses were able to survive the four-hour life test, with a maximum resistance shift of only 2.96%. The results of Tables 600 and 700 are consistent with measurements taken of similar cylindrical fuses without the pre-molded shield.

Figure 8:
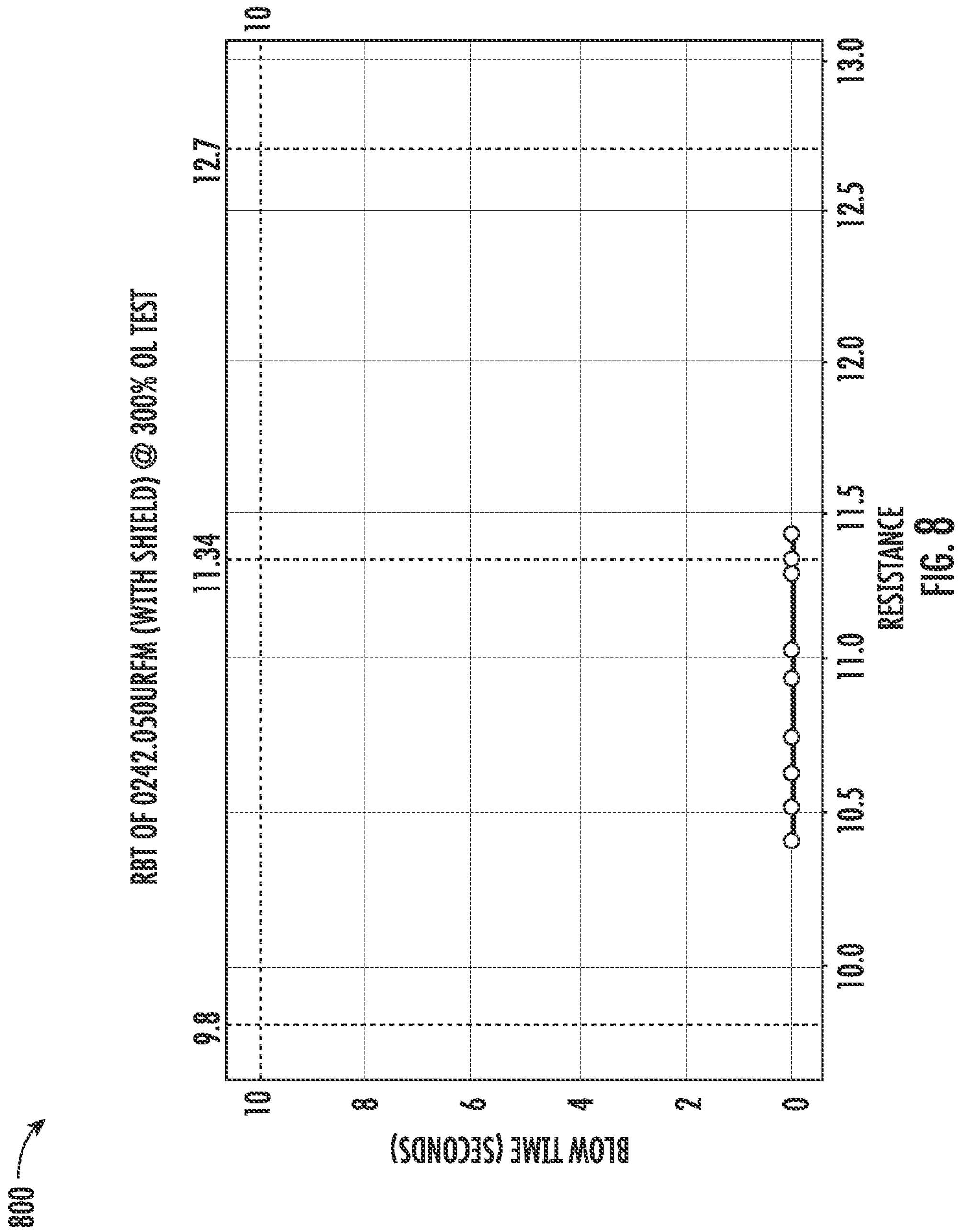
FIG. 8 is a graph illustrating characteristics of the shielded cylindrical fuse of FIGS. 2A-2B, in accordance with exemplary embodiments.

FIG. 8 is a representative graph 800 of the tests performed on the shielded cylindrical fuse, according to exemplary embodiments. The graph 800 is a plot of the data in Table 600, with the dots at the bottom showing the blow times for each fuse. Tables 600 and 700 and the graph 800 show that the cylindrical fuse is not negatively impacted from having the pre-molded shield thereon.

Figure 9:
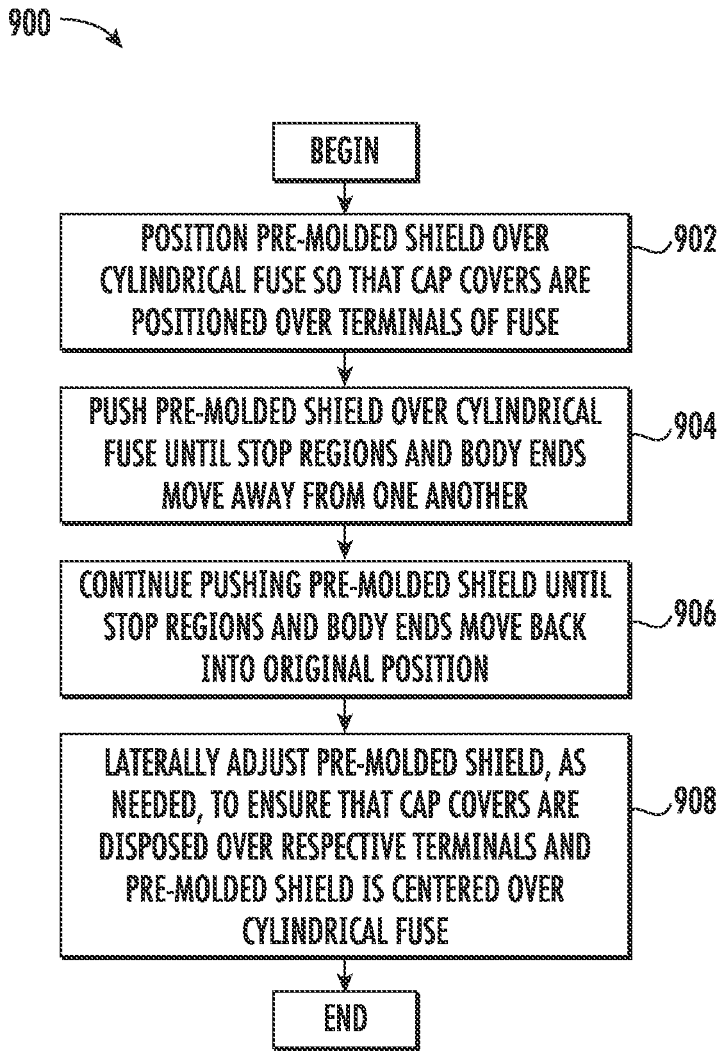
FIG. 9 is a flow diagram of a method of attaching the pre-molded fuse to a cylindrical fuse, according to exemplary embodiments.

FIG. 9 is a flow diagram 900 of a method of attaching the pre-molded 212 to a cylindrical fuse, such as the cylindrical fuse 202 of FIGS. 2A-2B, according to exemplary embodiments. Recall that the pre-molded shield 212 is made of a flexible material that bends at its end region, namely, where the stop regions 222 and body ends 304 are located. The pre-molded shield 212 is first positioned over the cylindrical fuse 202 so that the cap covers 218 are positioned over the end caps (terminals) 206 of the cylindrical fuse (block 902). Stop regions 222*a* and 222*b*, 222*c* and 222*d*, and body ends 304*a* and 304*b* are a first distance from one another. The pre-molded shield 212 is next pushed over the cylindrical fuse 202 until the stop regions 222 and body ends 304 move away from one another (block 902), due to the flexibility of the pre-molded shield 212. More particularly, stop regions 222*a* and 222*b* move apart from one another, similarly, stop regions 222*c* and 222*d* move apart from one another, and body ends 304*a* and 304*b* move apart from one another, until they are all a second distance from one another, the second distance being greater than the first distance. This is due to the fact that the stop regions 222*a* and 222*b*, stop regions 222*c* and 222*d*, and body ends 304*a* and 304*b*, when at the first distance from one another in their resting state, the first distance is smaller than the diameter of the cylindrical fuse 202.

The pre-molded shield 212 is further pushed so that respective opposing stop regions and body ends move back to their original position (block 906). At this point, the stop regions 222 and body ends 304 are disposed more than halfway over the cylindrical fuse 202, where the halfway point of the fuse is where the dimension of the fuse is greatest (its diameter). Because the dimension of the cylindrical fuse 202 gets smaller as the pre-molded shield 212 passes the halfway point, the opposing stop regions 222 and body ends 304 return to their original position. At this point, the pre-molded shield 212 is attached to the cylindrical fuse 202.

Lateral adjustments to the pre-molded shield 212, now attached to the cylindrical fuse 202, may be made, in some embodiments, to ensure that the cap covers 218 are disposed over respective end caps 206 of the cylindrical fuse (block 908) and to ensure that the pre-molded shield is centered over the cylindrical fuse. Lateral adjustment is movement of the pre-molded shield 212 left or right along the axis of the cylindrical fuse 202, as shown by the arrow, l, in FIG. 4C.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure is not limited to the described embodiments, but that it has the full scope defined by the language of the following claims, and equivalents thereof.

The invention claimed is:

1. A fuse shield, comprising:

a cylindrical body adapted to partially surround a cylindrical fuse;

a first cap cover disposed on a first side of the cylindrical body;

a second cap cover disposed on a second side of the cylindrical body, the second side being opposite the first side;

a first stop region disposed on a first edge of the first cap cover, the first stop region adapted to limit rotation of the cylindrical fuse to a first degree in a first direction on a flat surface;

a second stop region disposed on a first edge of the second cap cover, the second stop region adapted to limit rotation of the cylindrical fuse to the first degree in the first direction on the flat surface, wherein the first stop region is coplanar with the second stop region;

a third stop region disposed on a second edge of the first cap cover, the third stop region adapted to limit rotation of the cylindrical fuse to the first degree in a second direction on the flat surface, the second direction being opposite the first direction; and a fourth stop region disposed on a second edge of the second cap cover, the fourth stop region adapted to limit rotation of the cylindrical fuse to the first degree in the second direction on the flat surface;

wherein the first degree is not greater than 63°.

2. The fuse shield of claim 1, wherein the first cap cover is adapted to be disposed on a first end cap of the cylindrical fuse.

3. The fuse shield of claim 2, wherein the second cap cover is adapted to be disposed on a second end cap of the cylindrical fuse.

4. The fuse shield of claim 1, further comprising a flat portion disposed equidistant between the first edge and the second edge.

5. The fuse shield of claim 4, wherein the flat portion has a height, wherein the height enables a pick-and-place machine to retrieve the fuse shield by grabbing the flat portion.

6. The fuse shield of claim 1, wherein the fuse shield circumferentially surrounds between 65% and 85% of the cylindrical fuse.

* * * * *